US005495564A

United States Patent [19]

Takahashi

[11] Patent Number: 5,495,564

[45] Date of Patent: Feb. 27, 1996

[54] DEVICE FOR PROCESSING IMAGE DATA IN A VIRTUAL SCREEN AREA DERIVED FROM A MEMORY

[75] Inventor: Mitsuhiro Takahashi, Hokkaido, Japan

[73] Assignee: Hudson Soft Co., Ltd., Hokkaido, Japan

[21] Appl. No.: 112,257

[22] Filed: Aug. 26, 1993

[30] Foreign Application Priority Data

| | | | |
|---|---|---|---|
| Sep. 30, 1992 | [JP] | Japan | 4-285153 |
| Oct. 1, 1992 | [JP] | Japan | 4-284978 |

[51] Int. Cl.$^{6}$ ..... G06T 11/00

[52] U.S. Cl. ..... 395/135; 395/133; 395/154

[58] Field of Search ..... 395/133–139, 395/145, 147, 153, 154, 155, 157, 158, 161; 345/121, 122, 186, 200

[56] References Cited

U.S. PATENT DOCUMENTS

| | | | |
|---|---|---|---|
| 4,517,654 | 5/1985 | Carmean | 364/410 |
| 4,804,948 | 2/1989 | Nishi et al. | 345/186 |
| 4,864,289 | 9/1989 | Nishi et al. | 345/122 |
| 4,897,636 | 1/1990 | Nishi et al. | 345/121 |
| 4,992,961 | 2/1991 | Petersen | 345/200 |
| 5,245,322 | 9/1993 | Dinwiddie, Jr. et al. | 395/154 X |

FOREIGN PATENT DOCUMENTS

| | | |
|---|---|---|
| 473390A3 | 3/1992 | European Pat. Off. . |

*Primary Examiner*—Almis R. Jankus
*Attorney, Agent, or Firm*—Lowe, Price, LeBlanc & Becker

[57] ABSTRACT

A background image is composed of a plurality of background pictures to be superimposed on each other. Specific areas of the background pictures are displayed as a transparency so that the back side picture may be displayed through the transparent portion of the front side picture.

8 Claims, 26 Drawing Sheets

ENDLESS SCROLL MODE FOR SUB-PICTURE

ENDLESS SCROLL MODE FOR SUB-PICTURE

Note ; Numerals shown in the table indicate BAT addresses (for hexadecimal)

BGx = 0 : SUB-PICTURE NON-ENDLESS SCROLL MODE (TRANSPARENCE BASE MODE)

1 : SUB-PICTURE ENDLESS SCROLL MODE

FIG. 16

SCREEN SIZE REGISTER

BG0

| 15⋯⋯12 | 11⋯⋯8 | 7⋯⋯4 | 3⋯⋯0 |
|---|---|---|---|
| SUB-PICTURE n | SUB-PICTURE m | MAIN PICTURE n | MAIN PICTURE m |

BG1～BG3

| 15⋯⋯12 | 11⋯⋯8 | 7⋯⋯4 | 3⋯⋯0 |
|---|---|---|---|
| NOT USED | | MAIN AND SUB PICTURE n | MAIN AND SUB PICTURE m |

SCREEN SIZE = $(2^n \times 2^m)$ dots $m, n = 3 \sim 9$

16 COLOR MODE

64K COLOR MODE

16M COLOR MODE

FIG. 26

BG PRIORITY REGISTER

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | RSW | BG0 PRIORITY | | | BG0 PRIORITY | | | BG0 PRIORITY | | | BG0 PRIORITY | | |

RSW = 0 : NON-ROTATION
= 1 : ROTATION

BG SCREEN PRIORITY = 4 : FIRST SCREEN (FOREMOST)
= 1 : LAST SCREEN (HINDMOST)
= 0 : UNUSED SCREEN (PROHIBITED ANY BG PROCESS)

Note : 5 to 7 are prohibited to be set, and 1 to 4 are prohibited to be double set.

SUPERIMPOSITION OF BG0, AND BG1

SUPERIMPOSITION OF BG0, AND BG2

SUPERIMPOSITION OF
BG0, BG1, AND BG2

DEVICE FOR PROCESSING IMAGE DATA IN A VIRTUAL SCREEN AREA DERIVED FROM A MEMORY

BACKGROUND OF THE INVENTION

The present invention relates to an image processing apparatus, and more particularly to a computer graphic apparatus which synthesizes a plurality of images on a virtual screen.

The virtual screen, derived from a memory of a computer, is taken to have an area larger than that of the real screen. When image data on the virtual screen are moved in a vertical or horizontal direction, image data on the real screen is scrolled. In this scroll mode, one end of the virtual screen is connected to the other end if the image on the real screen is scrolled out from the virtual screen, because the virtual screen is limited in size.

FIG. 1 shows a relation between the virtual and real screens in a horizontal scroll mode. When the virtual screen is moved to the right on the figure, a wave-shaped picture illustrated on the virtual screen is moved to the right on the real screen. When one end point "B" of the wave is reached at the real screen, the other point "A" is displayed following the point "B" on the real screen. This process is called an "endless scroll".

FIG. 2 shows the principal of operation of the endless scroll technique. In the endless scroll mode, it may be considered that an image is drawn on the virtual screen shaped in the form of a cylinder, and the image is seen on the real screen by rotating the cylinder continuously. Actually, the virtual screen is also butted together in the vertical direction, so that the virtual screen is formed on a spherical surface rather than a cylindrical surface. This endless scroll mode is called the "Chazutsu" mode.

In a game computer treating many animation images, a background image (BG) and a sprite image (SP) are superimposed on the virtual screen. The background and sprite images are composed of character patterns and sprite patterns, respectively. A position of each character is defined by a raster and a character pitch on the real screen (CRT). Therefore, the background image may be defined by positions, colors and patterns of the characters. The positions of the characters to be displayed are indicated by coordinates on the CRT.

The background image is managed by using a background attribute table (BAT) and character generator (CG) in the memory (RAM), as shown in FIG. 3. The BAT specifies positions and colors of the characters to be displayed. The CG is taken in the RAM, and the CG stores actual character patterns corresponding to CG codes in the BAT.

According to the endless scroll mode, the virtual screen needs an area at least that of the real screen. Further, a plurality of background pictures can not be displayed independently of each other on one screen. If an outside area of the virtual screen is displayed using no endless scroll technique, a disturbed image like a ghost is displayed at the edge portion of the virtual screen.

In the conventional computer, if a plurality of background images BG1 to BG3 are synthesized with each other, each background image needs its own bus (BUS1 to BUS3) and a video encoder to display them, as shown in FIG. 4. In this case, when some background images are selected from BG1 to BG3, each bus needs to be connected to a fader. The background image to be displayed has a 100% brightness, and the others have 0% brightness. According to the system, if the background images are increased in number, a circuitry in the computer becomes complicated, and as a result, the computer must perform much processing.

SUMMARY OF THE INVENTION

It is an object of the present invention to provide a high performance computer in which a plurality of background images may be synthesized on a virtual screen by a simple circuit structure.

It is another object of the invention to provide a high performance computer in which high quality image data may be displayed using no endless scroll mode.

According to the invention, in an image processing apparatus, a background image to be displayed on a virtual screen is stored in a memory. Some parts of the background image are displayed as a transparent.

BRIEF DESCRIPTION OF THE DRAWINGS

FIG. 16 is a diagram showing the configuration of a screen size register in accordance with the preferred embodiment.

FIG. 26 is a diagram showing the configuration of a BG priority register used in the computer system shown in FIG. 17.

DETAILED DESCRIPTION OF THE INVENTION

Hereinafter, an image processing apparatus of a preferred embodiment according to the present invention will be explained in conjunction with appended drawings.

Figure 5:
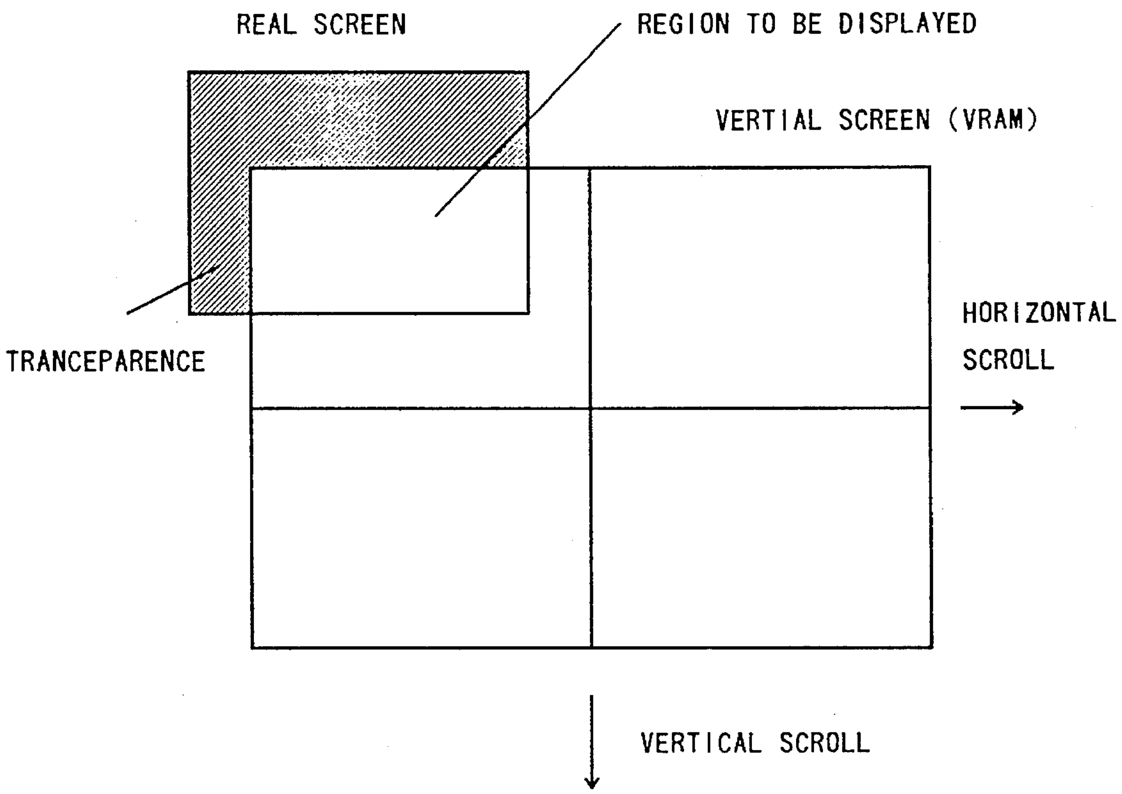
FIG. 5 is a diagram showing the relation between a real screen and virtual screen taken in a memory of a computer system for a preferred embodiment according to the invention.

FIG. 5 shows a relation between a real screen and virtual screen taken in a memory in a computer system of the preferred embodiment. In the preferred embodiment, a region of the real screen located out of the virtual screen is displayed as transparent (shown by slanted lines) so that no disturbed picture is displayed at the region out of the virtual screen.

In this embodiment, BG pictures to be synthesized are stored in a work RAM (KRAM), and the BG pictures are processed in accordance with a predetermined priority. The synthesizing algorithm is performed by a controller chip shown in FIG. 6. Generally, the entirety of each BG picture is not stored in the KRAM, that is, necessary regions of each BG picture only are stored sectionally therein. However, image data like a natural picture are wholly stored in the KRAM.

Figure 6:
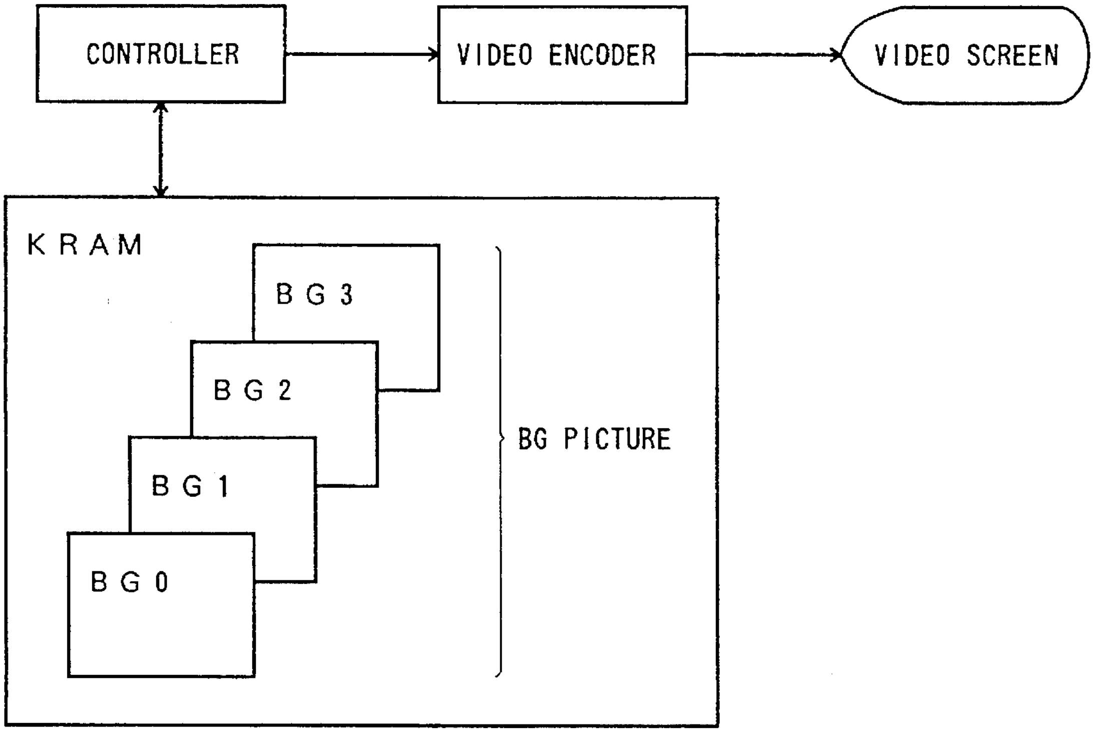
FIG. 6 is a diagram showing operation for displaying a background image in accordance with the preferred embodiment.

The BG pictures are compiled on the virtual screen in accordance with a predetermined priority. In this process, BG pictures BG0 to BG3 are arranged in the order of higher priority, that is, BG picture BG0 with the first priority is arranged at the front and the others BG1 to BG3 are arranged behind the BG0 in the same order, as shown in FIG. 6.

Figure 7:
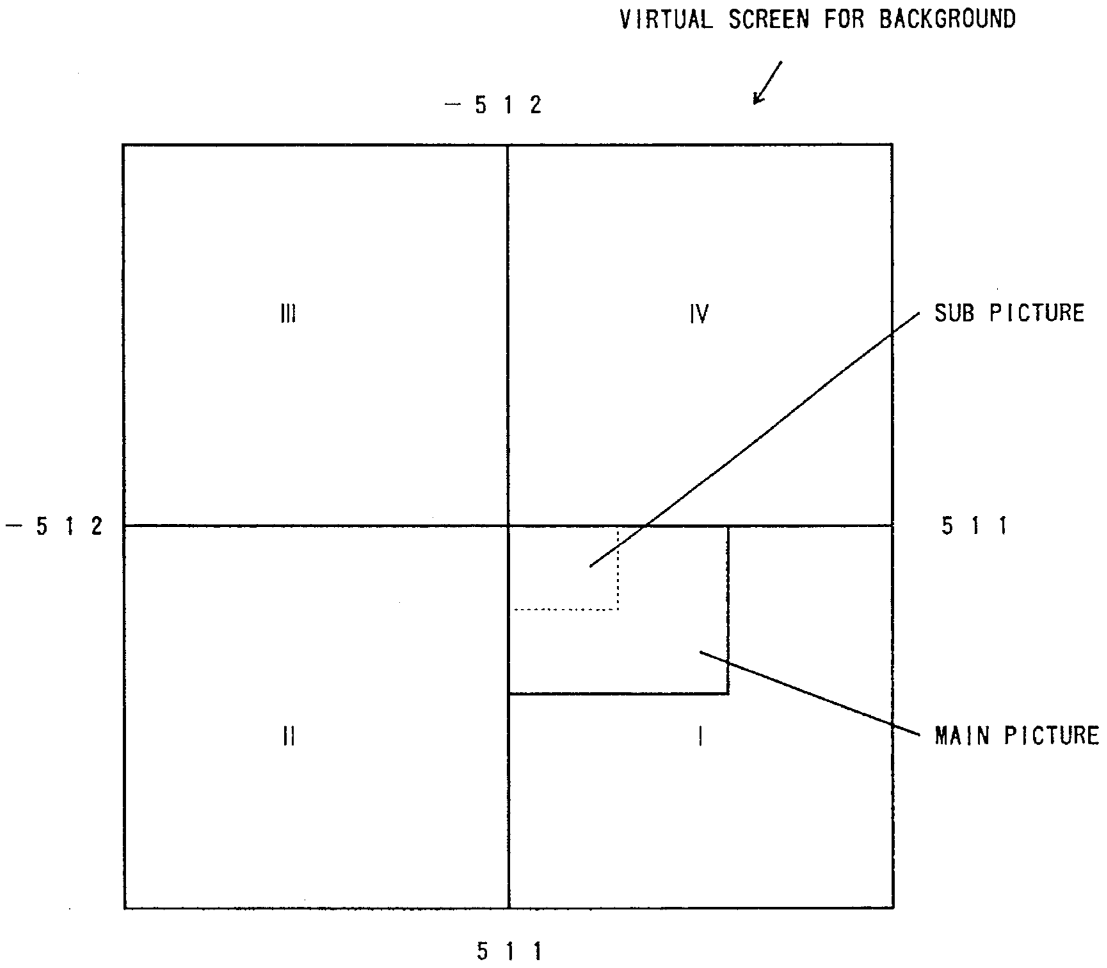
FIG. 7 is a diagram showing a coordinate of the background image including a main picture and sub-picture in accordance with the preferred embodiment.

FIG. 7 shows a virtual screen coordinate system for the background image including a main picture and sub-picture, the system being composed of 1024×1024 dots arranged in the horizontal and vertical ranges of –512 to –512. This coordinate system is used for an endless scroll mode ("Chazutsu" mode), that is, the right and bottom edges of the first quadrant are connected to the second and fourth quadrants, respectively. In the coordinate system, a real screen area is taken by 256×240 dots. When the real screen area is moved up-and-down or right-and-left on the virtual screen (virtual screen coordinate system), the image is scrolled on the CRT display.

According to the preferred embodiment, both the main and sub-pictures are used for the background image. The main picture is superimposed on the sub-picture.

Figure 8:
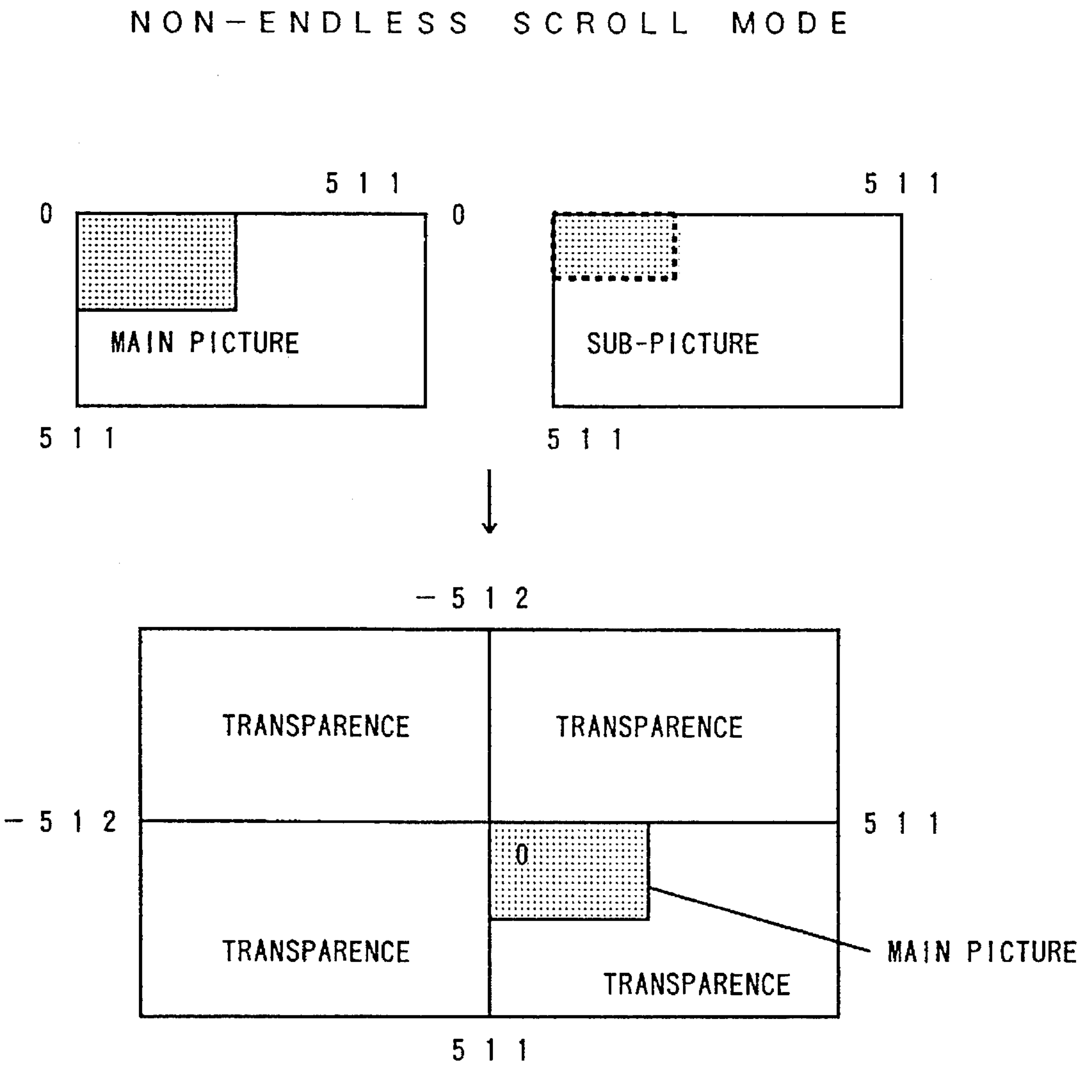
FIGS. 8 and 9 are diagrams each showing the arrangement of the main and sub-pictures in a non-endless scroll mode of the preferred embodiment.
Figure 9:
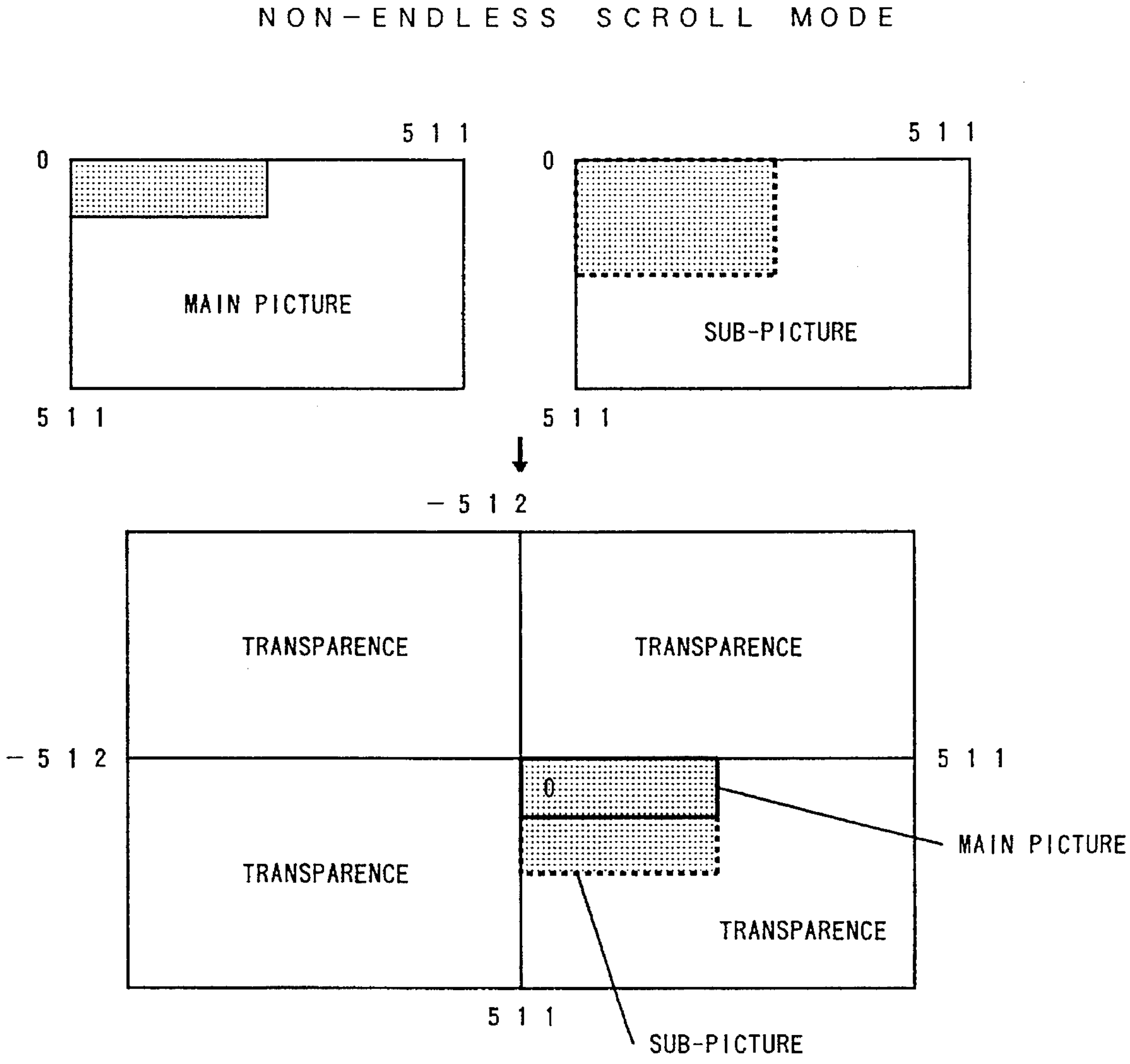

Each of FIGS. 8 and 9 shows the arrangement of the main and sub-pictures in a non-endless scroll mode ("non-Chazutsu" mode). In the non-endless scroll mode, the region other than the main and sub-pictures is displayed as transparent on the virtual screen, so that the region is also displayed as transparent on the CRT display. Therefore, the region other than the main and sub-pictures is displayed clearly on the CRT display without disturbed image.

Figure 10:
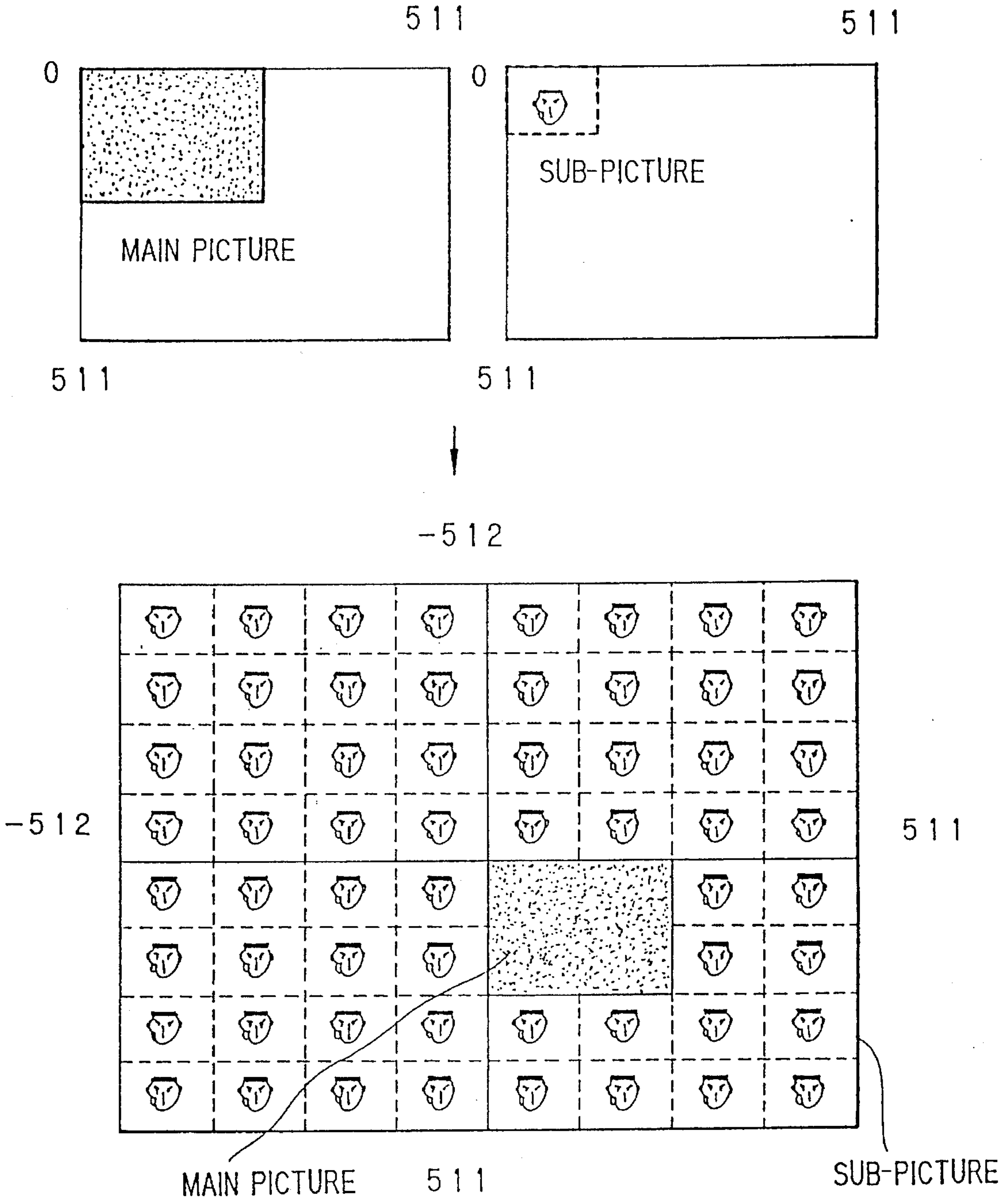
FIGS. 10 and 11 are diagrams each showing the arrangement of the main picture in the non-endless scroll mode and sub-picture in an endless scroll mode, according to the preferred embodiment.
Figure 11:
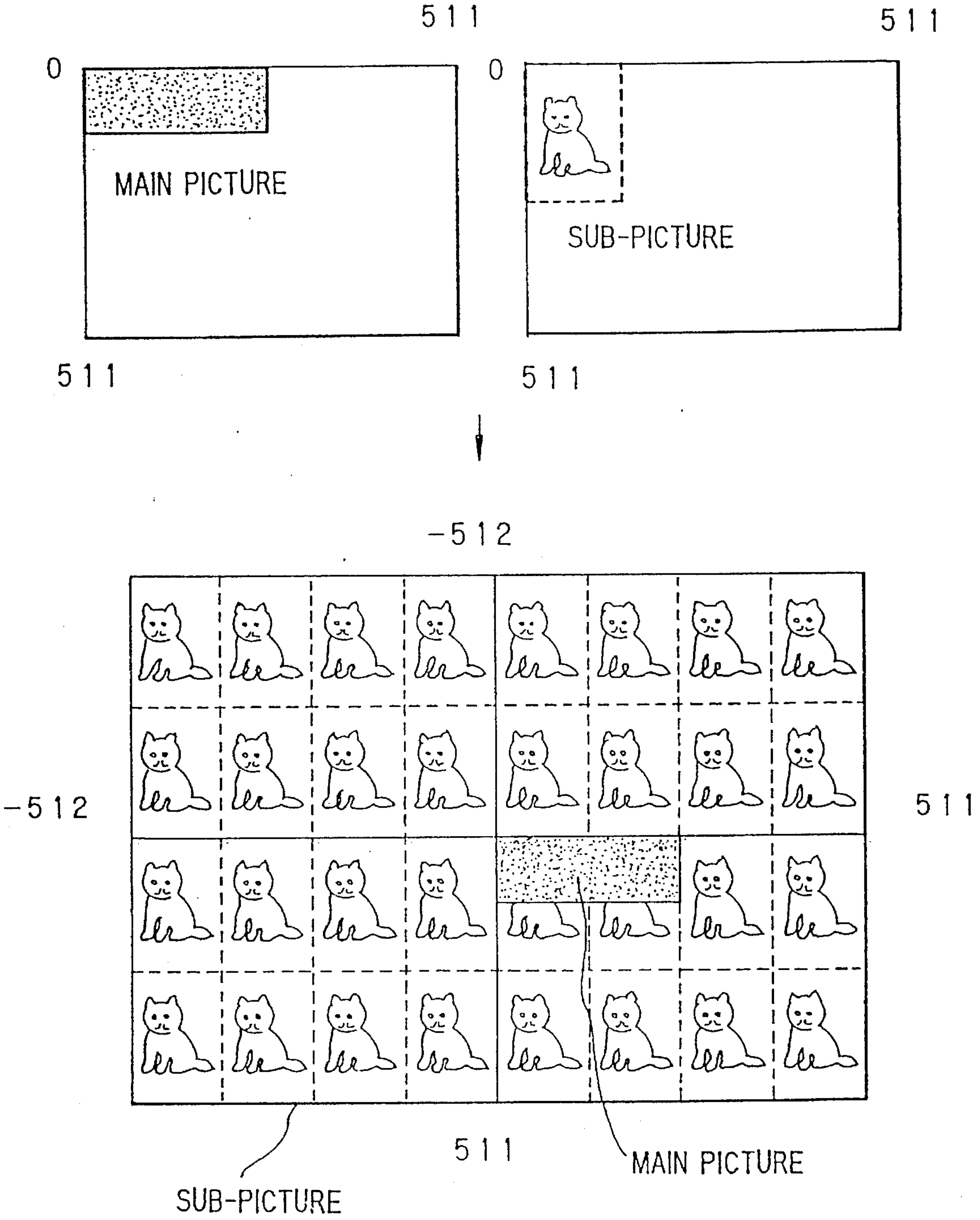

Each of FIGS. 10 and 11 shows the arrangement of the main picture in the non-endless scroll mode and the sub-pictures in the endless scroll mode. In this case, the same sub-pictures are shown as "tiles" on the virtual screen throughout, so that the sub-picture is displayed repeatedly on the CRT display when the real screen is scrolled. Therefore, either of the endless and non-endless scroll modes is available independently of the sizes of the main and sub-pictures.

Figure 12:
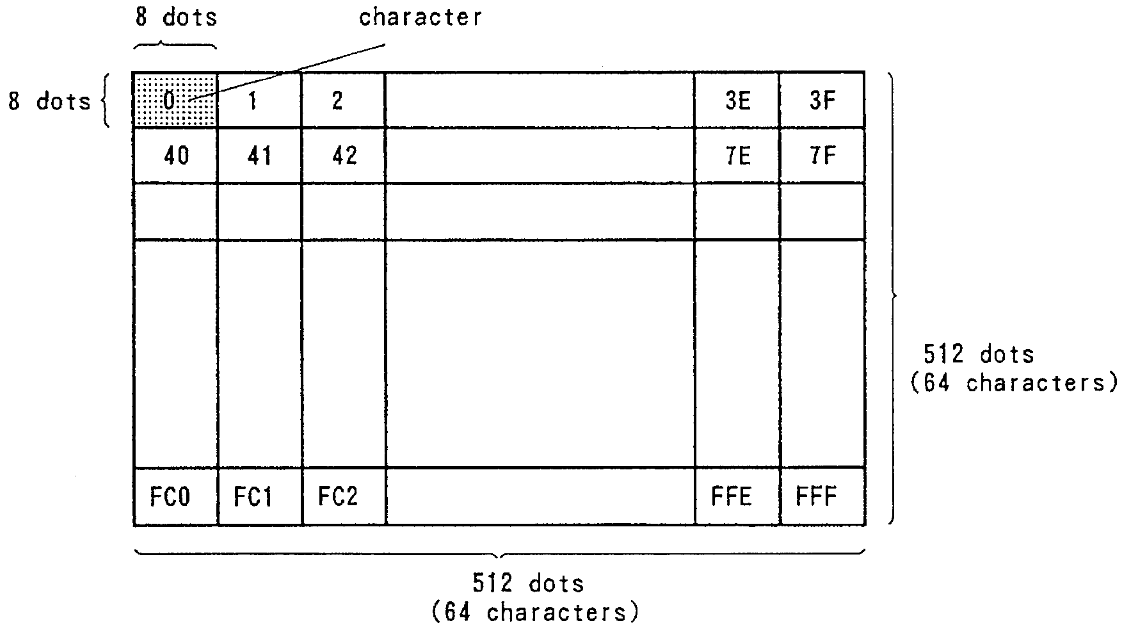
FIG. 12 is a matrix diagram showing the address arrangement of a BAT (background attribute table) on the virtual screen, according to the preferred embodiment.

FIG. 12 shows the address arrangement of a BAT (background attribute table) on the virtual screen. The BAT addresses are arranged in an area "512×512" dots (64×64 character), where each character is composed of 8×8 dots.

On the background picture BG0, each of the main and sub-pictures is managed by using the BAT and CG separately so that two pictures look as if they are simultaneously displayed on the BG screen.

Figure 13:
FIG. 13 is a diagram showing the configuration of a scroll mode setting register for the sub-picture in accordance with the preferred embodiment.

The functions of the endless and non-endless modes may be built in a hardware of the computer, and the scroll mode of the sub-picture is set in a scroll mode specifying register shown in FIG. 13. In the register, "0" and "1" specify the non-endless and endless scroll modes, respectively. When the scroll mode is established initially, the scroll process is carried out automatically. Therefore, it is not necessary that the scroll mode be controlled by a user program directly later. The mode setting is effective only for the sub-picture, not for the main picture.

Figure 14:
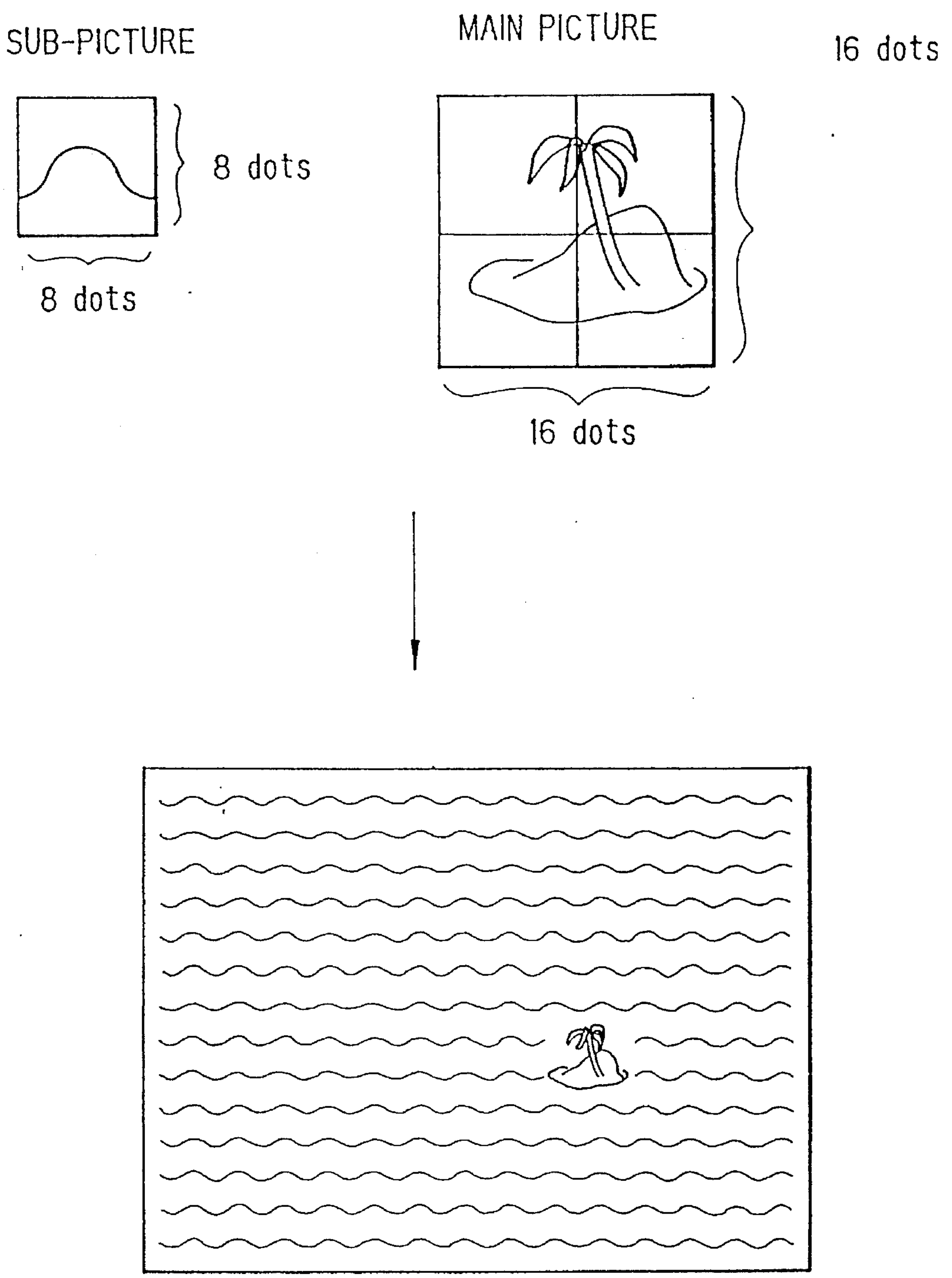
FIG. 14 is a diagram showing the operation when the main and sub-pictures are used for the background image in the preferred embodiment.

FIG. 14 shows a display example in the case where the main and sub-pictures are displayed on the background picture BG0. In this case, a wave is drawn on the sub-picture of one character (8×8 dots), and an island is pictured on the main picture of 4 characters. When the sub-picture is set in the endless scroll mode, the wave is developed on the virtual screen throughout, and therefore the island floating on the wave may be displayed on the BG screen.

Figure 15:
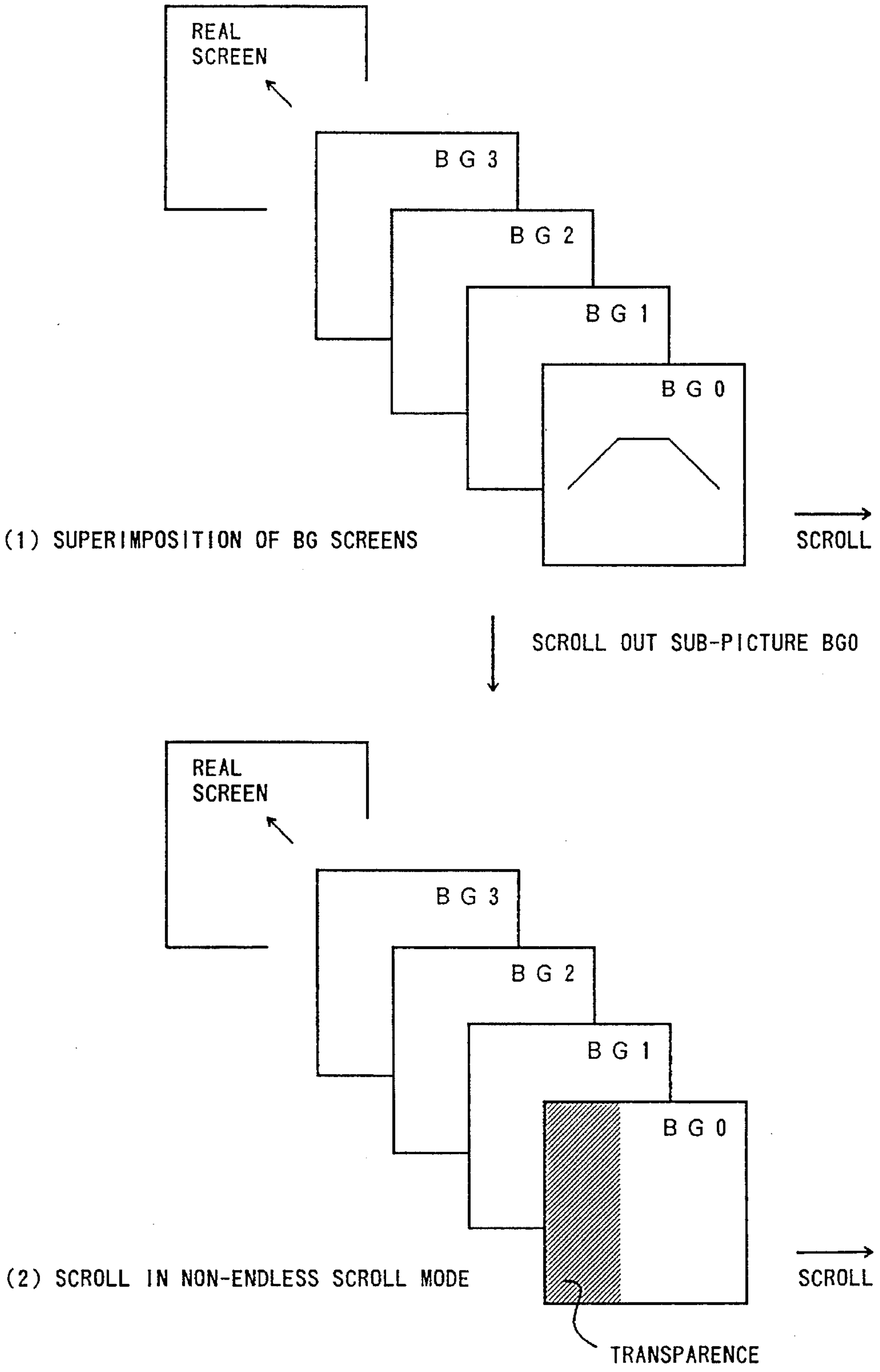
FIG. 15 is a diagram showing the operation of the non-endless mode of the preferred embodiment.

FIG. 15 shows the operation of the non-endless scroll mode, superimposing the 4 BG pictures BG0 to BG3. When BG picture BG0 is scrolled out in the horizontal direction, the scrolled out region becomes transparent and the background picture BG1 behind BG0 appears.

According to the invention, the sub-picture is developed on the virtual screen throughout in the endless scroll mode, and is shown as transparent in the non-endless scroll mode. Therefore, the picture size can be changed freely, whereby the memory (RAM) is used effectively. Further, if the main picture is formed smaller than the sub-picture, the main picture is displayed as in a window.

FIG. 16 shows the configuration of a screen size register in which sizes of the main and sub-pictures are set. The sizes of the pictures are sizes of original pictures (the number of picture elements) stored in the KRAM. The screen size register contributes to realize the effective use of the memory.

Figure 17:
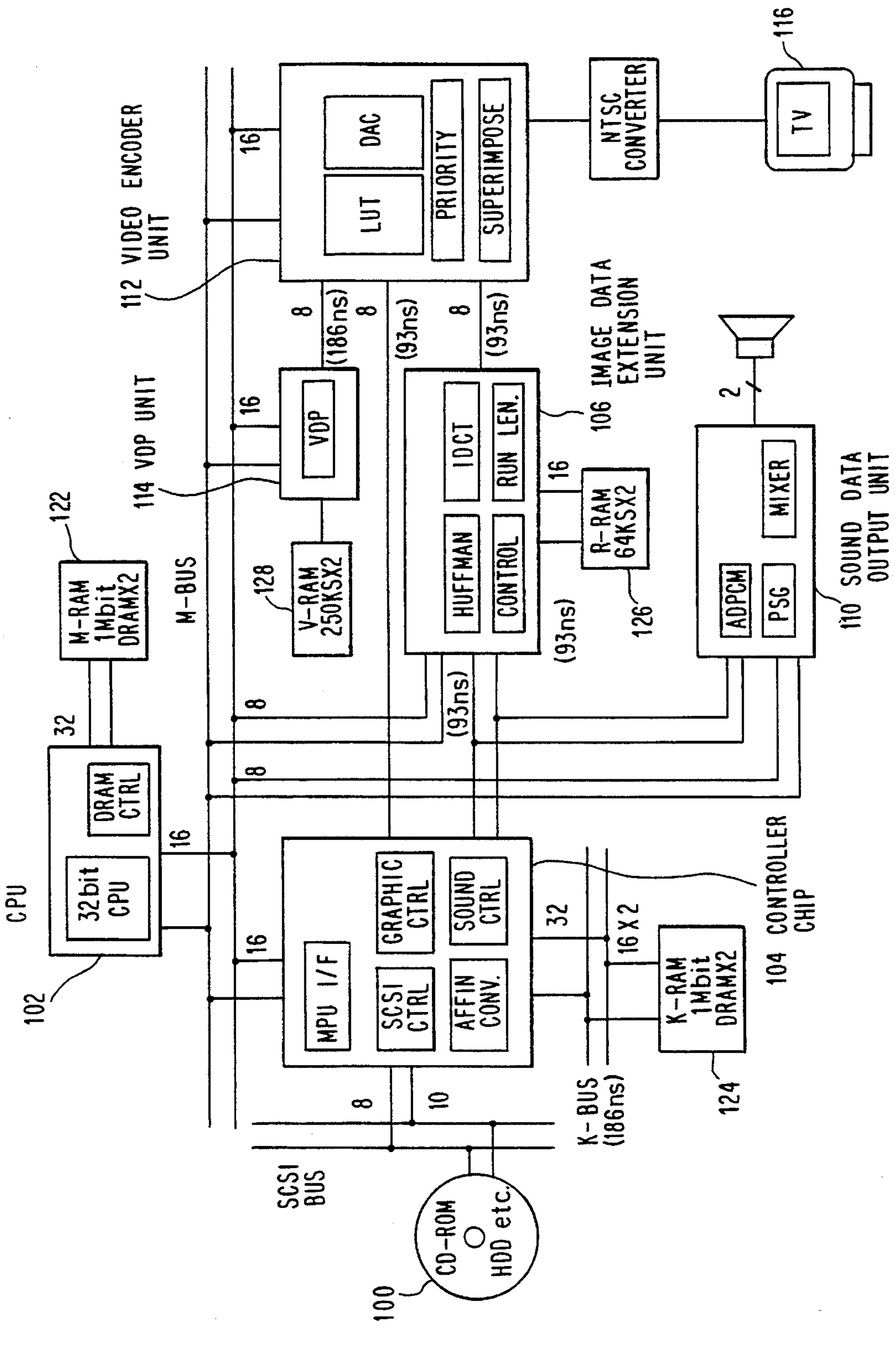
FIG. 17 is a block diagram showing a computer system according to the preferred embodiment.

FIG. 17 shows a computer system having the registers according to the invention. The computer system includes a recording medium 100 such as a CD-ROM for game-software, a CPU 102 of 32-bit type, a controller chip 104 for mainly controlling transmission of image and sound data and interfacing most devices to each other, an image data extension unit 106, a sound data output unit 110, a video encoder unit 112, a VDP unit 114 and a TV display monitor 116.

CPU 102, controller chip 104, image data extension unit 106 and VDP unit 114 are provided with their own memories M-RAM 122, K-RAM 124, R-RAM 126 and V-RAM 128, respectively.

Figure 18:
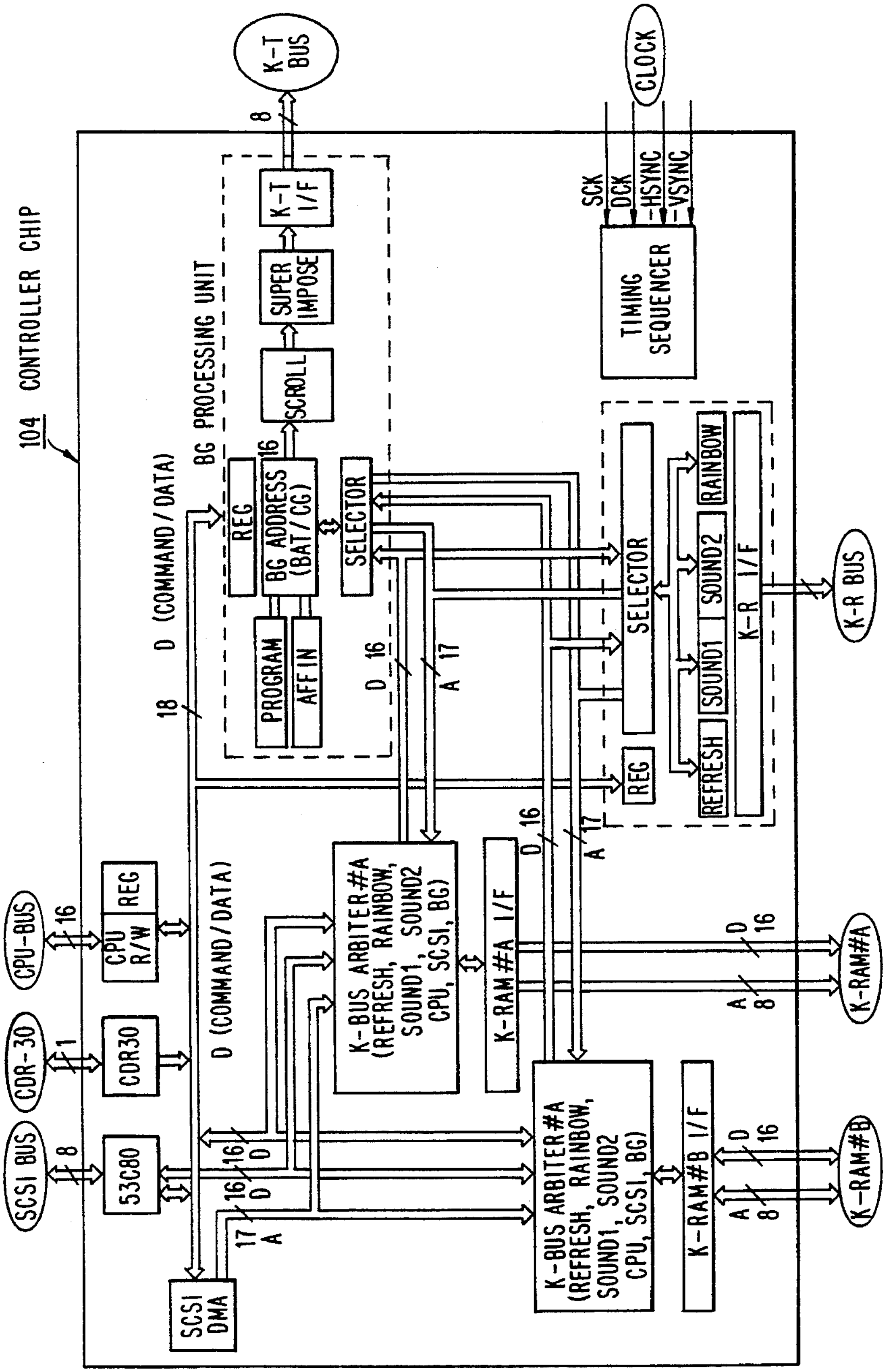
FIG. 18 is a block diagram showing a controller chip contained in the computer system shown in FIG. 17.

FIG. 18 shows the controller chip, which is provided with an SCSI controller, graphic controller and a sound controller. In the controller chip, a variety of data are read from the CD-ROM by the SCSI controller, the read data are stored in the K-RAM. The K-RAM can store a variety of types of data such as 8 bits data and 16 bits data. The controller chip may treat four background pictures BG0 to BG3 simultaneously.

According to the controller chip, three types of data sequence processes, "external block sequence," "external dot sequence" and "internal dot sequence," are carried out. On the other hand, the conventional computer system treats BG data of the external block sequence type only, each block being composed of 64 dots (8×8).

The three types of sequence processes are now explained.

(1) EXTERNAL BLOCK SEQUENCE PROCESS

Figure 1:
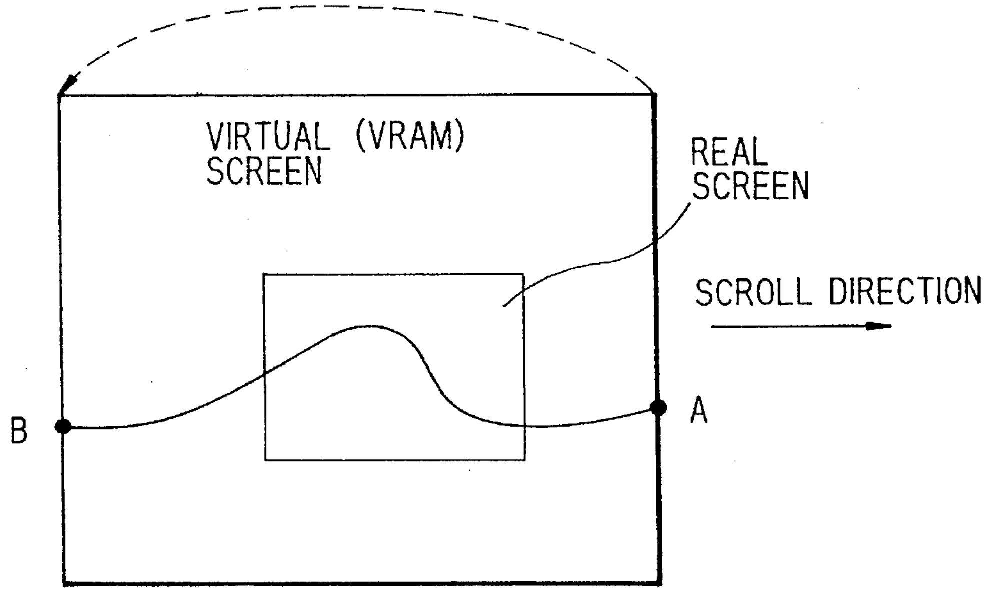
FIG.1 (PRIOR ART)
FIG. 1 is a diagram showing a relation between a real screen and virtual screen in an endless scroll mode ("Chazutsu" mode) according to a conventional computer system.
Figure 2:
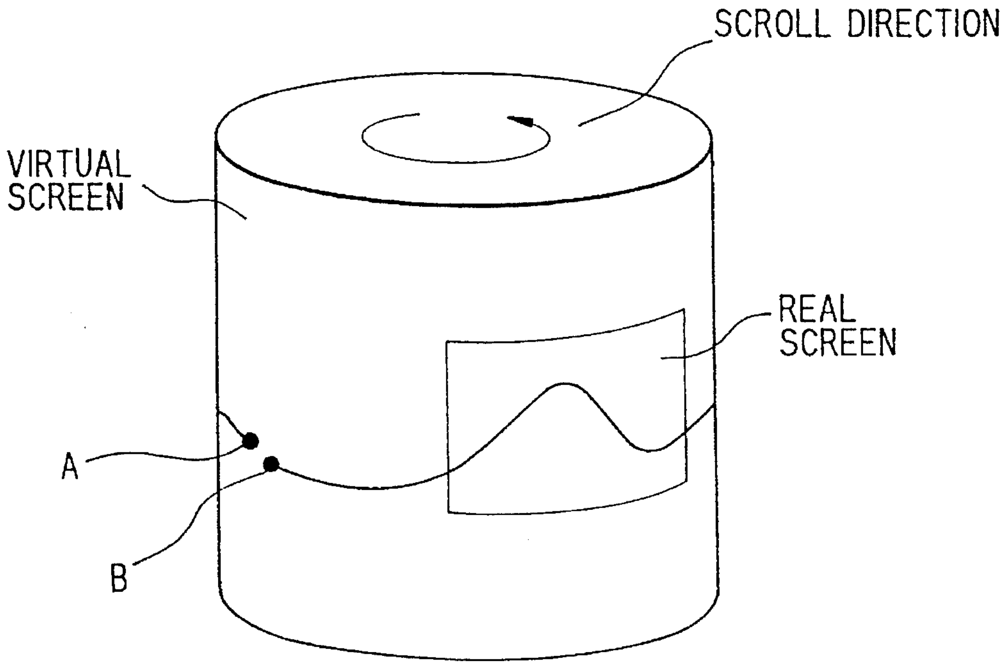
FIG.2 (PRIOR ART)
FIG. 2 is a conceptual view showing the operation of the endless scroll mode in accordance with the conventional system.
Figure 3:
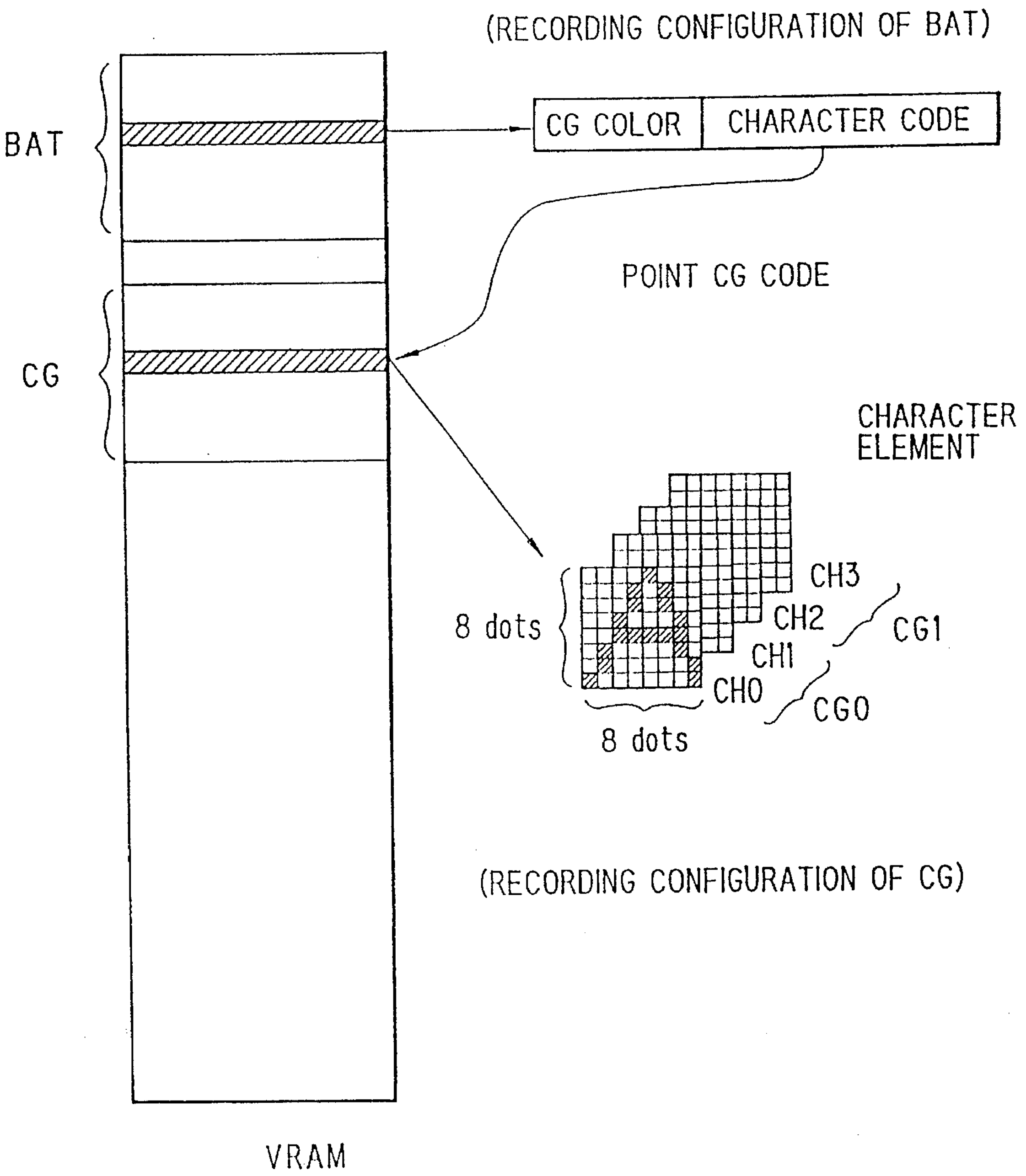
FIG. 3 PRIOR ART
FIG. 3 is a diagram showing the configuration of a VRAM in accordance with the conventional system.
Figure 4:
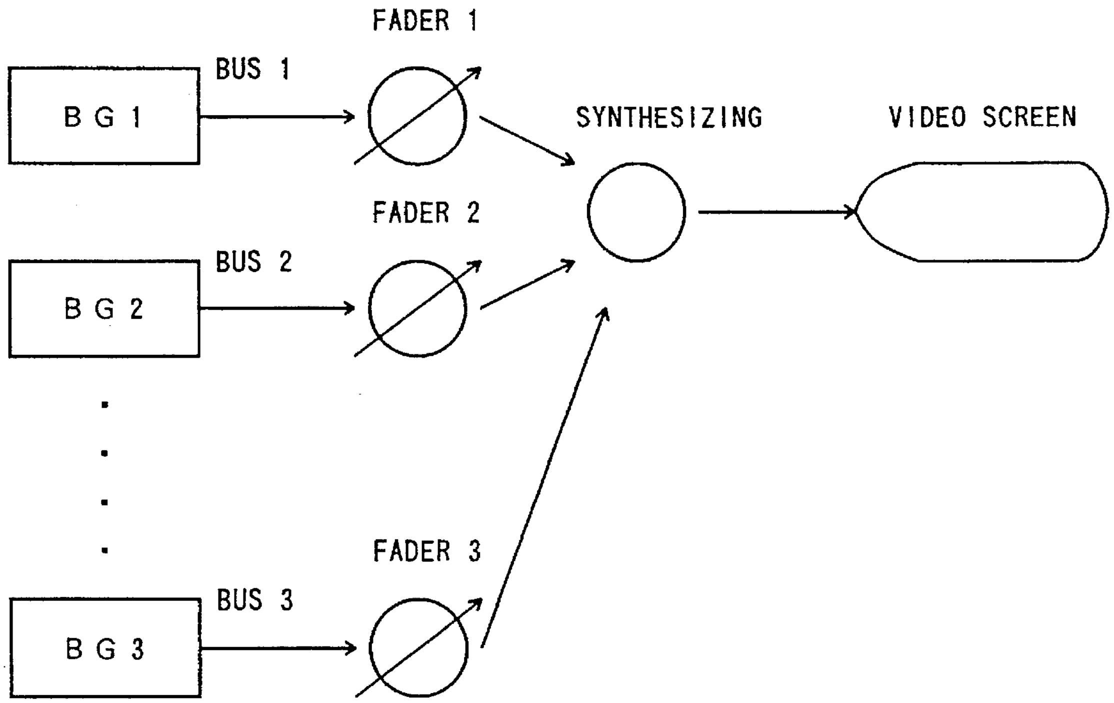
F I G. 4 PRIOR ART
FIG. 4 is a block diagram illustrating another conventional computer system.
Figure 19:
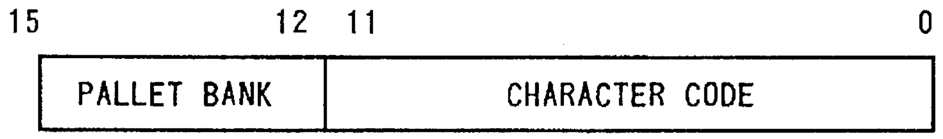
FIG. 19 is a diagram showing the configuration of an external block sequence data used for the preferred embodiment.

FIG. 19 shows a BAT (background attribute table) which is composed of a pallet bank and character code. The pallet bank stores data corresponding to a bank stored in the video encoder, the pallet bank corresponding to "CG COLOR" shown in FIG. 3. The color pallet includes color groups each composed of, for example, 16 colors, the color groups being selected in accordance with data stored in the pallet bank.

The pallet bank is effective in a 4 color mode and 16 color mode only, and other color modes are neglected. The character code is used for specifying a CG (character generator), whereby a CG address is defined by the character code and data in a CG address register. Each character pattern is defined by 64 dots of "8×8" by the CG. A bits number "n" required for representing each dot is given by the following equation, where colors of the number "m" are used simultaneously to display the dot. The numbers of dots required to define a color for one dot are different depending on the color modes.

$$n = \mathrm{Log}_2\, m$$

When "m" is 4, 16, 256, 64k or 16M, "n" becomes 2, 4, 8, 16 and 24. A RAM is arranged in address by 16 bits (=1 word), so that 2 dots are indicated by 32 bits when "m=16M".

Figure 20:
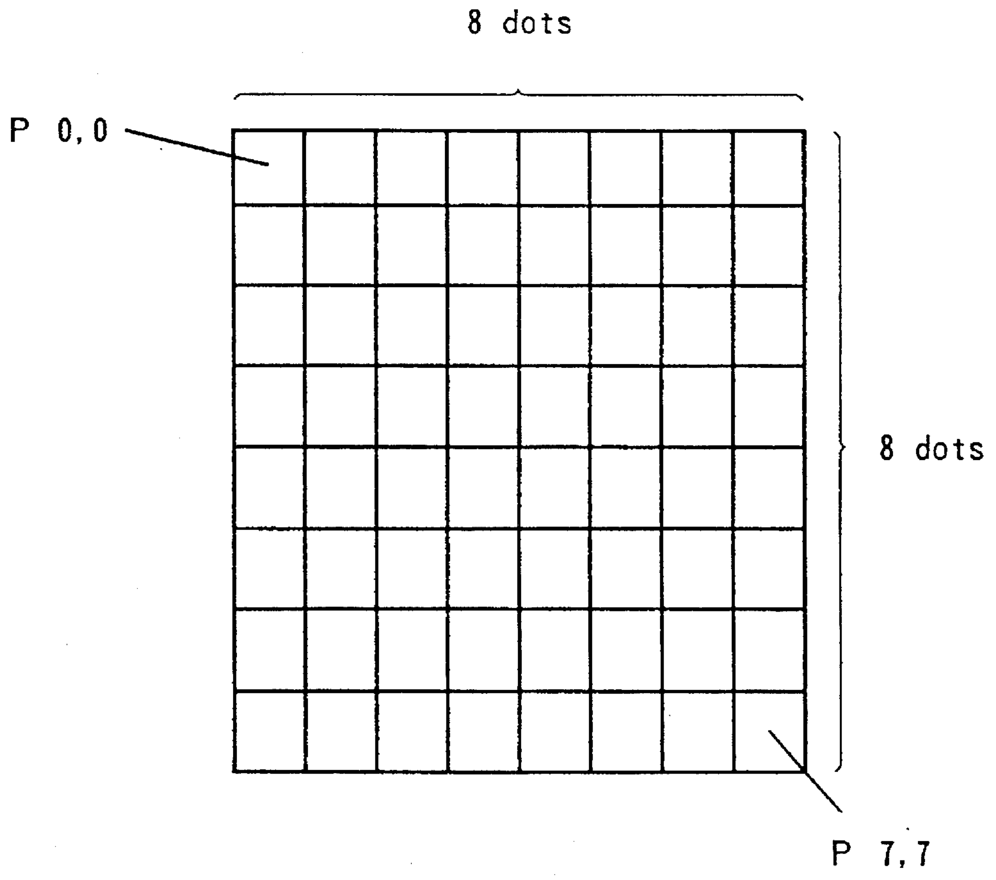
FIG. 20 is a diagram showing the structure of a character used for the preferred embodiment.

In FIG. 20, "i, j" of $P_{i,j}$ represents a dot position (line, column) of the character and "p" represents a pallet number.

Figure 21:
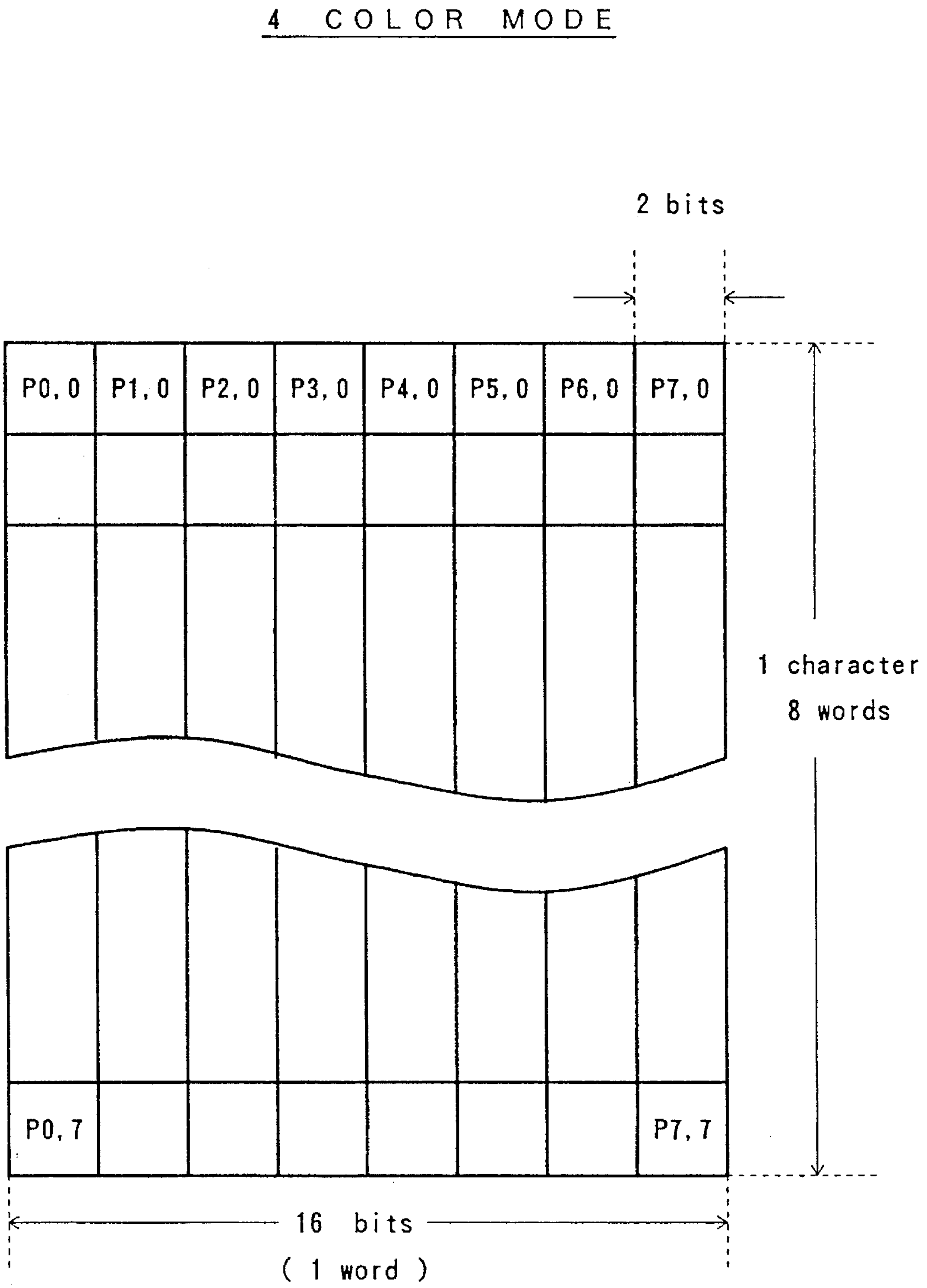
FIG. 21 is a diagram showing the memory arrangement of a RAM in a 4 color mode, the RAM being included in the computer system shown in FIG. 17.
Figure 22:
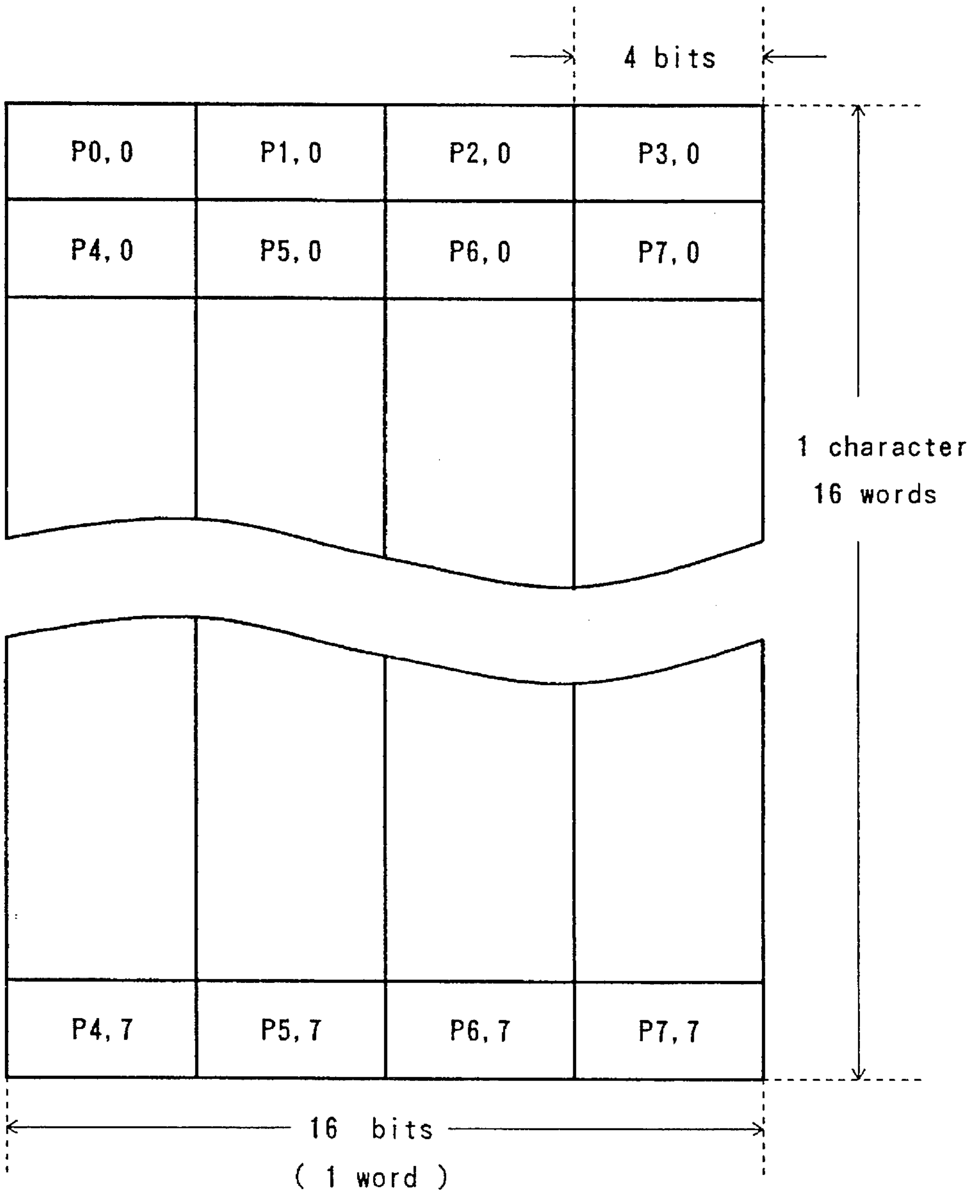
FIG. 22 a diagram showing the memory arrangement of the RAM in a 16 color mode in accordance with the preferred embodiment.
Figure 23:
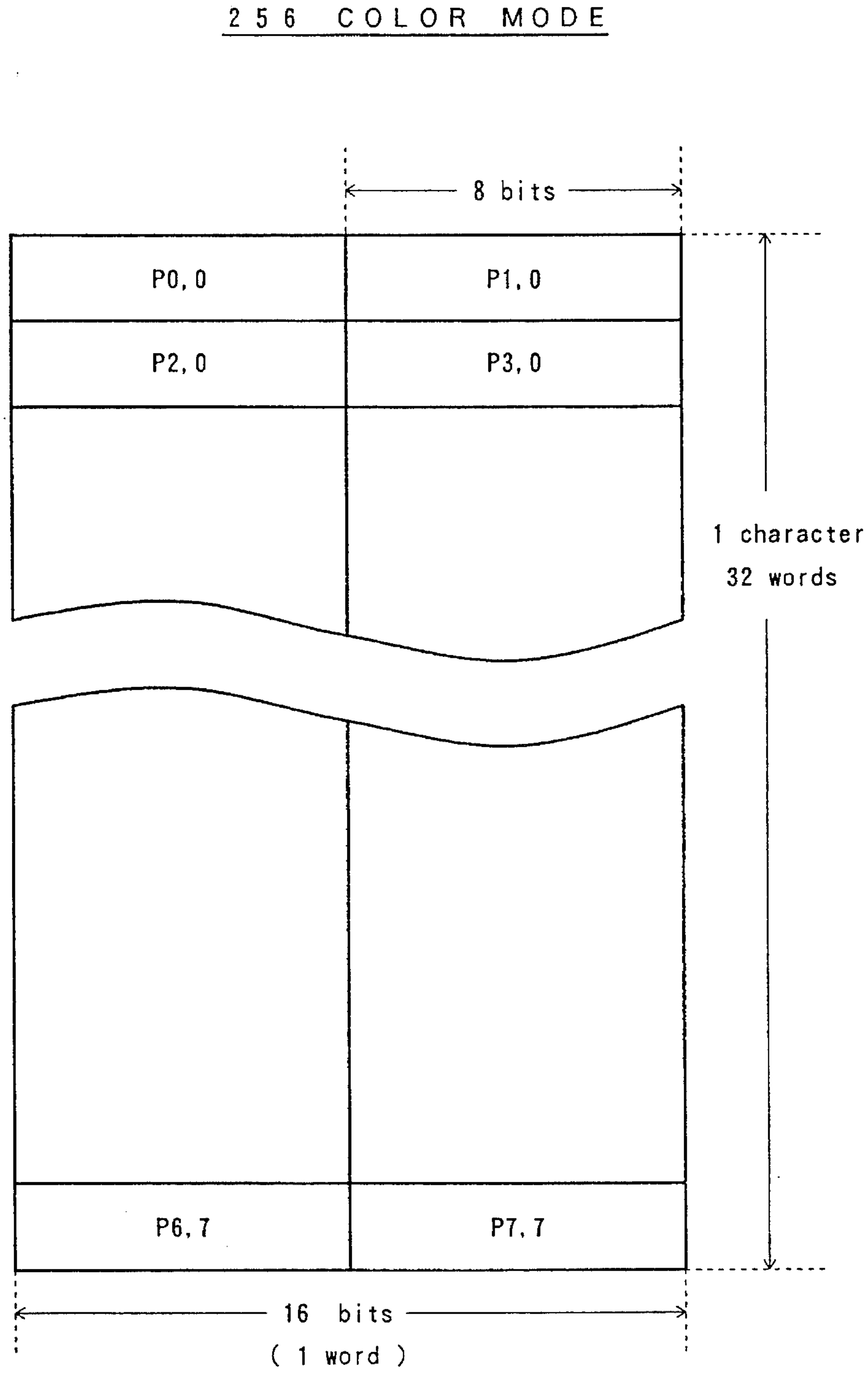
FIG. 23 is a diagram showing the memory arrangement of the RAM in a 256 color mode in accordance with the preferred embodiment.

FIGS. 21, 22 and 23 show the structures of the RAM in 4, 16 and 256 colors modes, respectively. In accordance with the RAM structures, positions on the color pallet, which are used for specifying a color to be displayed, are defined. The color pallet has a capacity of 256 colors, so that a color to be displayed may be selected directly in the 256 color mode. In other words, the pallet bank is not necessary in the 256 color mode.

Figure 24:
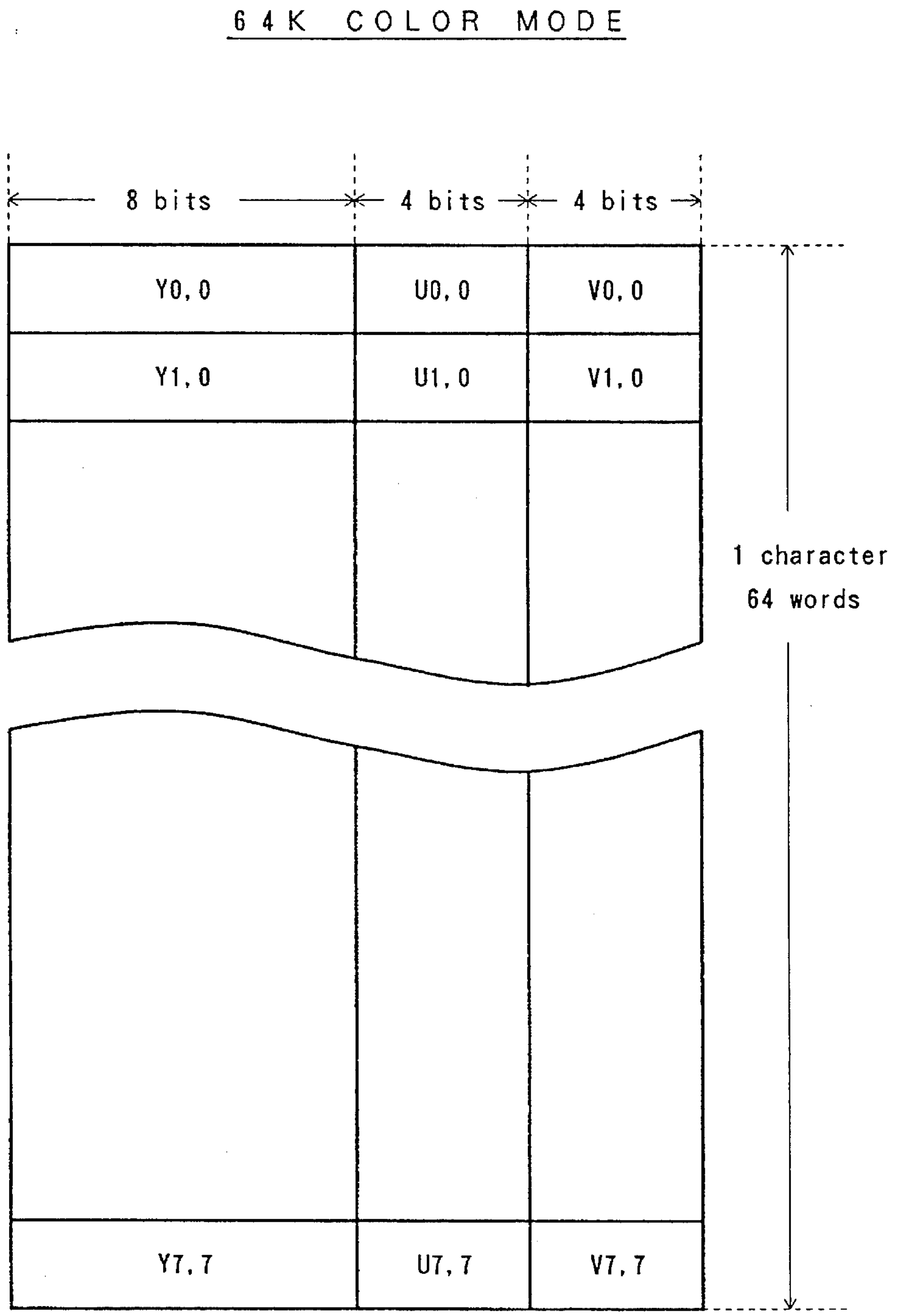
FIG. 24 is a diagram showing the memory arrangement of the RAM in a 64K color mode in accordance with the preferred embodiment.
Figure 25:
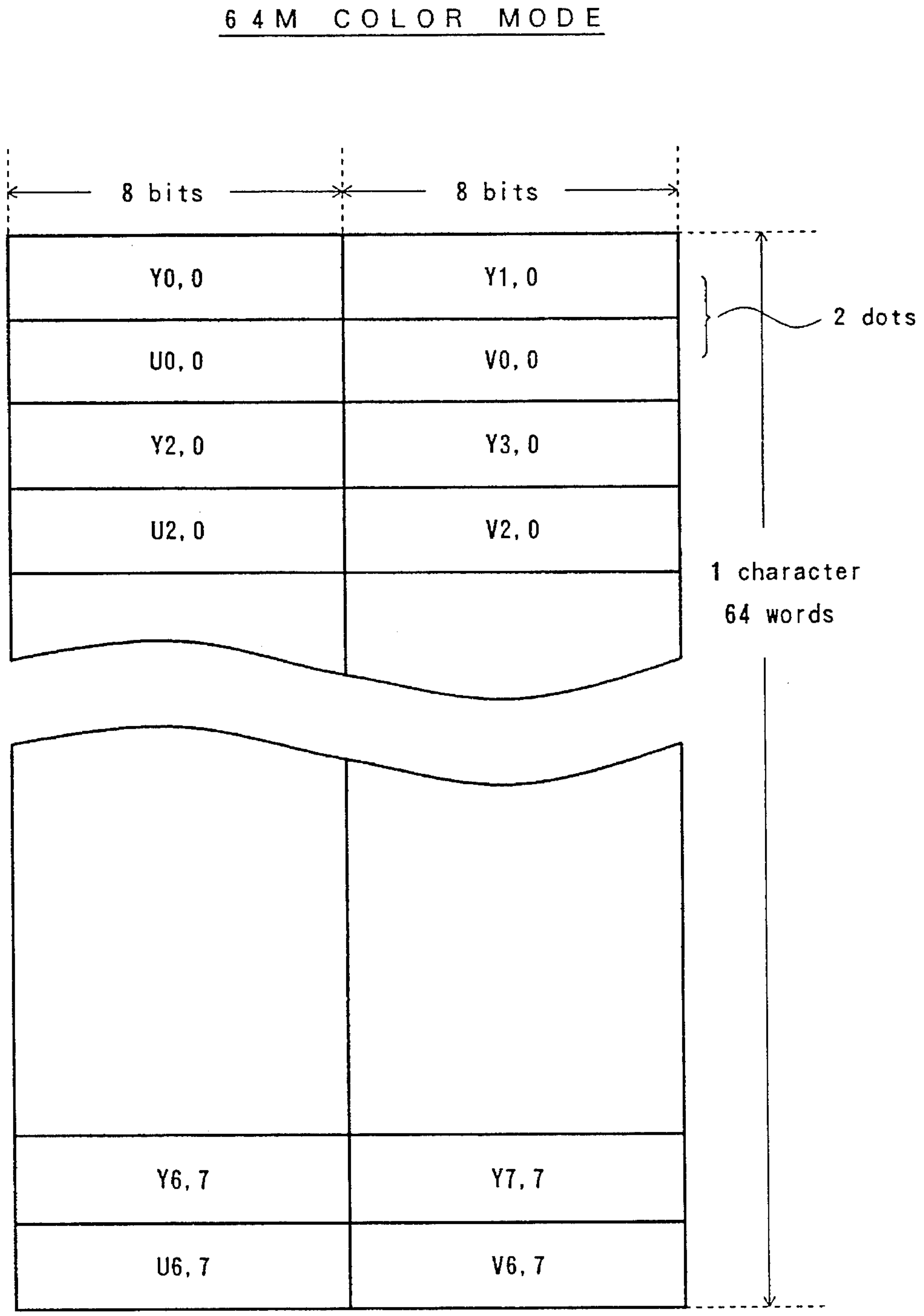
FIG. 25 is a diagram showing the memory arrangement of the RAM in a 16M color mode in accordance with the preferred embodiment.

FIGS. 24 and 25 show the structures of the RAM in 64K and 16M color modes, respectively. In these color modes, color data are specified directly without using the color pallet. In the 64K color mode, one dot color data are specified by YUV (Y of 8 bits, U of 4 bits and V of 4 bits). On the other hand, in the 16M color mode, two dots color data are specified by YYUV (Y of 8 bits, Y of 8 bits, U of 8 bits and V of 8 bits). The first "Y" represents brightness of a first dot, the second "Y" represents brightness of a second dot and "U" and "V represent common color shift of the first and second dots.

On a natural picture, successive dots are not very different in color from each other, so that the next dots may be separated in color by adjusting the brightness thereof. Thus, a character pattern may be defined by small data. As a result, the character pattern may be defined by 64 word data which is the same as that in 64k color mode. According to the external dot sequence system, the conventional BG image data may be used as they are.

(2) EXTERNAL DOT SEQUENCE PROCESS

The external dot sequence process is basically equal to the external block sequence process; however, image data are processed dot-by-dot, not block-by-block (character-by-character). Therefore, only one line in the tables shown in FIGS. 21 to 25 is used to define the CG. In 16M color mode, two lines are used to define two dots. The external dot sequence process is especially good for using the memory when a color is continuously changed with time or with position on an image. According to the external block sequence process, the memory can be used effectively when image data have the same color.

(3) INTERNAL DOT SEQUENCE PROCESS

In the internal dot sequence process, colors are defined for each dot in the same manner as the external dot sequence process. The BAT is not necessary because the image data are not required to be defined by a user. According to the internal dot sequence process, a natural picture supplied from an image scanner or the like is directly displayed by a bit-map technique. In the 16M color mode, two dot data may be defined by two words of YYUV. Therefore, 16M colors can be defined by the CG having a small capacity, and repeatability of the image is not seriously affected by the process. The internal dot sequence process is especially useful for the case where a natural picture is displayed and each dot of the image has independent color data. As mentioned above, according to the internal dot sequence process, a picture supplied from an external visual unit may be treated the same as the others, so that the data process becomes simple.

Generally, the foremost BG picture appears only when the BG pictures are superimposed. However, when a part of the foremost picture is displayed as a transparency, the BG picture behind the foremost picture appears through the transparent portion.

In this embodiment, the BG image is defined by the YUV system data for each dot picture elements whose color data meet the following condition are treated as transparent.

16M color mode: The first Y of the YYUV data is "0".

64K color mode: The first Y of the YUV data is "0".

256 color mode: The pallet number of 8 bits is "0".

16 color mode: The pallet number of 4 bits is "0".

4 color mode: The pallet number of 2 bits is "0".

The pallet numbers are pointed by color data of 2, 4 and 8 bits in the 4, 16 and 256 color modes, respectively.

The BG pictures are superimposed in accordance with the transparency and priority information, which is set in a BG priority register, shown in FIG. 26, by a user program.

In the BG priority register, when "R-SW" of the 12th bit is set at "0" or "1", a non-rotation or rotation processes is performed, respectively. When "BG0" is set at "4" or "1", the BG picture is arranged at the foremost or backmost, respectively. When "BG0" is set at "0", the BG picture is prohibited from any process. All four of the BG pictures are not necessarily used, that is, some pictures may set at "0" so that the pictures are not superimposed. This operation is important to avoid a useless process.

Figure 27:
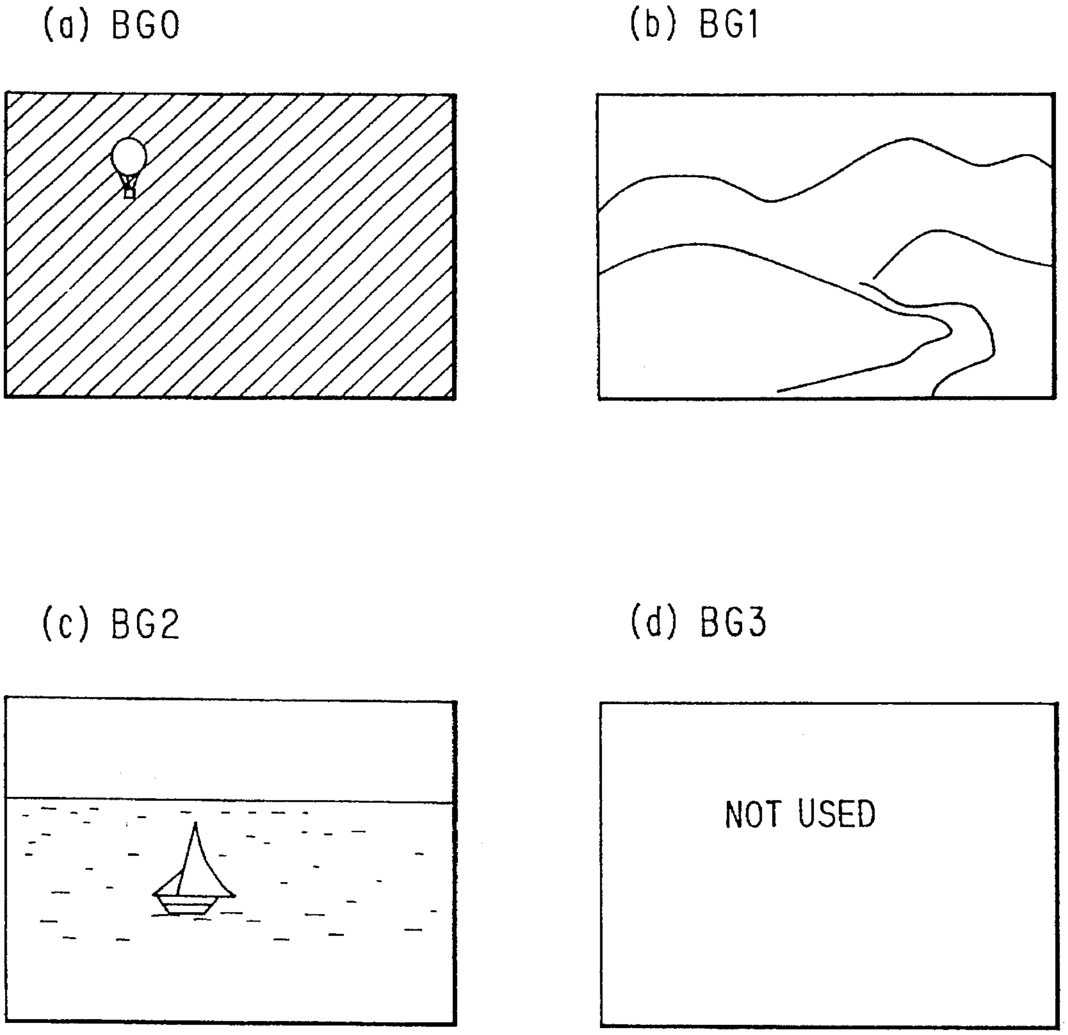
FIGS. 27 to 31 are diagrams showing the superimposing operation of BG pictures in the preferred embodiment, respectively.
Figure 28:
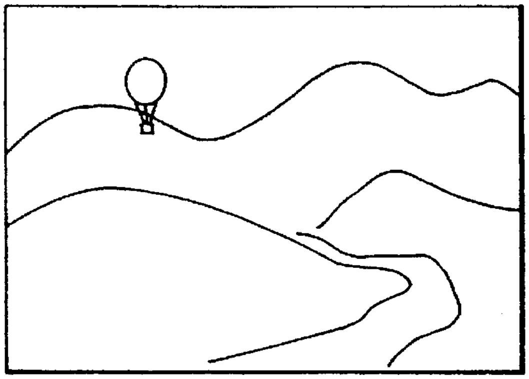

FIGS. 27 to 31 show a superimposing operation of BG pictures BG0 to BG3. In the first case, a balloon, mountain and sea are shown on BG pictures BG0 to BG2, respectively, and BG picture BG3 is not used, as shown in FIG. 27. On BG0, regions other than the balloon are transparent. When the BG pictures are superimposed under a condition that priorities "P0" to "P3" for BG pictures BG0 to BG3 are set as P0=4, P1=3, P2=0 and P3=0, the image is as shown in FIG. 28. In this case, BG2 and BG3 do not concern the superimposition, BG0 with higher priority (4) is arranged in front of BG1 with lower priority (3), and BG1 appears through the transparent region of BG0. Even if the balloon is moved on the screen, the balloon is not concealed behind the mountain because of the highest priority of the balloon.

Figure 29:
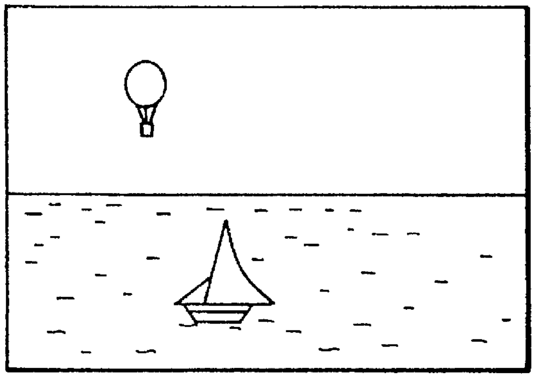

After that, priorities p0 to P3 are set as P0=4, P1=0, P2=3 and P3=0, and the image is displayed as in FIG. 29. In this case, the balloon looks as if it is moved from the mountain to the sea.

Figure 30:
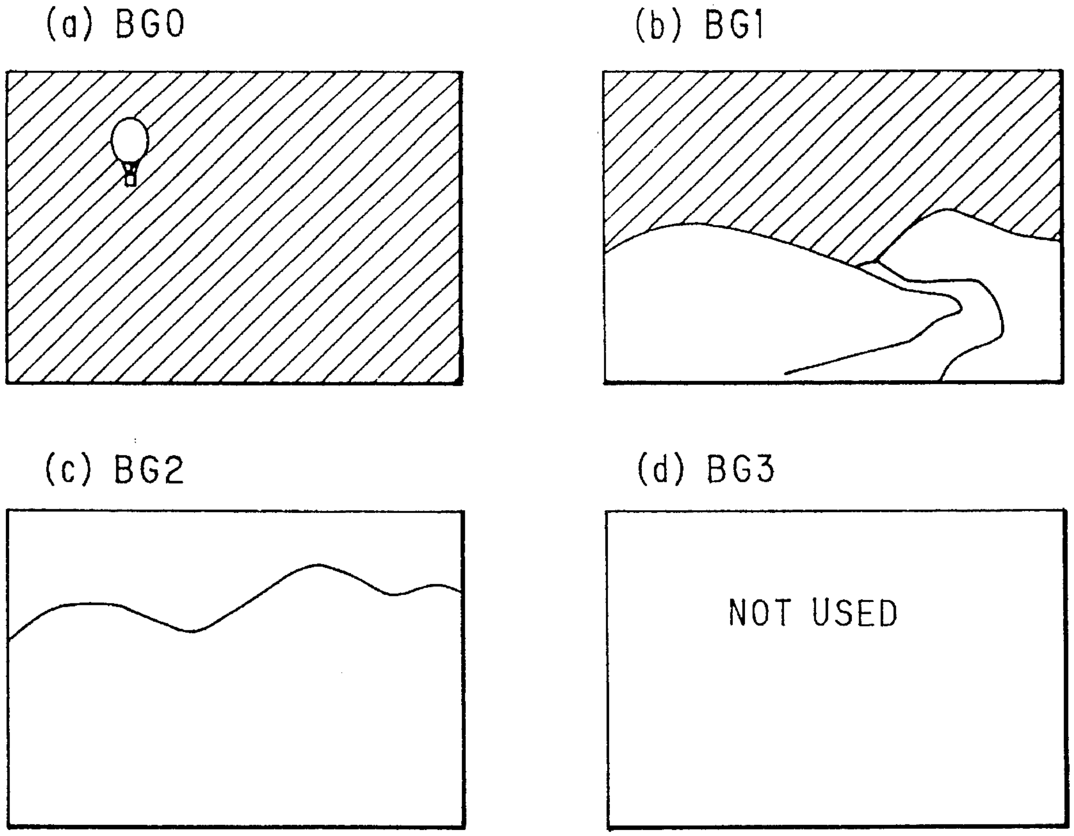
Figure 31:
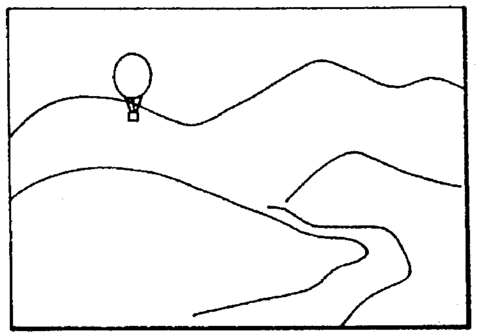

In the second case, a balloon, lower mountain and higher mountain are shown on BG pictures BG0 to BG2, respectively, and BG picture BG3 is not used, as shown in FIG. 30. In BG pictures BG0 and BG2, the regions other than the balloon and mountain are shown as transparent, respectively. When the BG pictures are superimposed under a condition that priorities P0 to P3 of BG pictures BG0 to BG3 are set as P0=3, P1=4, P2=2 and P3=0, the image is displayed as in FIG. 31. This image looks like that in FIG. 27, however, the balloon is concealed behind the lower mountain when the balloon is moved across that mountain, but is not concealed behind the higher mountain. Thus, the balloon appears and disappears when the balloon is moved right and left. Consequently, the image may be displayed in perspective.

As described above, according to the invention, the background pictures are superimposed by the controller chip of an IC, so that the entirety of the BG image may be supplied from the controller chip to the following stage once. Therefore, the computer system needs only one bus line, whereby the structure of the system becomes simple. Further, a plurality of background pictures are displayed simultaneously by adjusting the priorities thereof, that is, if a fore side picture has a transparent region, a back side picture can be seen through the transparent region. At this time, the picture can be displayed in perspective, when the fore side picture is scrolled at a higher speed and the back side picture is scrolled at a lower speed.

I claim:

1. A device for processing image data, comprising:

a memory, from which a virtual screen area is derived, for storing image data in the virtual screen area;

input means for inputting image data, composed of at least one image picture, into the memory;

addressing means for addressing the memory for a display area to be displayed, wherein an area outside the virtual screen area may be addressed;

color specifying means for specifying at least one color to the virtual screen area and transparency to an area outside the virtual screen area; and display means for displaying image data located within the addressed display area with the color specified by the color specifying means.

2. The device according to claim 1, wherein:

said inputted image data are composed of first and second image pictures, the first image picture being overlapped on the second image picture.

3. The device according to claim 1, wherein:

said color specifying means also specifies transparency to the area outside the display area.

4. The device according to claim 1, wherein:

said device is used for a game computer system, and said image data are for background.

5. The device according to claim 4, wherein:

said addressing means addresses an area outside the virtual screen area when the image is required to be scrolled in the display means.

6. A device for processing image data, comprising:

a memory, from which a virtual screen area is derived, for storing image data in the virtual screen area;

input means for inputting image data composed of first and second image pictures into the memory, the first image picture being overlapped on the second image picture;

addressing means for addressing the memory for a display area to be displayed, wherein the memory may be addressed so as to scroll the display area;

scroll mode specifying means for specifying first and second scroll modes to the first and second image pictures so that the first scroll mode is applicable to each of the first and second image pictures and the second scroll mode is applicable to only the second image picture, wherein the display area is scrolled in a range limited by the virtual screen area in the first scroll mode, and a plurality of the second image pictures are spread all over the virtual screen area in the second scroll mode and the display area is scrolled endlessly from one end to the opposite end of the virtual screen;

color specifying means for specifying at least one color to the virtual screen area and transparency to an area outside an area occupied by the first and second image pictures; and display means for displaying image data located in the addressed display area with the color specified by the color specifying means.

7. A device for processing image data, comprising:

a memory for storing image data composed of a plurality of image planes;

priority means for determining priorities of the plurality of image planes;

arranging means responsive to the priority means for superimposing the plurality of image planes, according to the determined priorities, to form a display image to be displayed; and scroll means for scrolling said plurality of image planes individually.

8. A device for processing image data, comprising:

a memory, from which a virtual screen area is derived, for storing image data in the virtual screen area;

input means for inputting image data, composed of a plurality of image pictures, into the memory;

priority means for determining priorities of the plurality of image pictures;

arranging means responsive to the priority means for superimposing the plurality of image pictures, according to the determined priorities to form a display image to be displayed;

addressing means for addressing the memory for a display area to be displayed, wherein an area outside the virtual screen area may be addressed;

color specifying means for specifying at least one color to virtual screen area; and display means for displaying image data located within the addressed display area with the color specified by the color specifying means.

* * * * *